United States Patent
Kamal

(10) Patent No.: US 12,386,644 B2
(45) Date of Patent: Aug. 12, 2025

(54) CONTROLLER AREA NETWORK EMULATION ARCHITECTURE

(71) Applicant: Ford Global Technologies, LLC, Dearborn, MI (US)

(72) Inventor: Andrew Magdy Kamal, Washington Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 344 days.

(21) Appl. No.: 18/145,064

(22) Filed: Dec. 22, 2022

(65) Prior Publication Data
US 2024/0211286 A1    Jun. 27, 2024

(51) Int. Cl.
*G06F 9/455* (2018.01)

(52) U.S. Cl.
CPC ...... *G06F 9/45504* (2013.01); *G06F 9/45558* (2013.01); *G06F 2009/45579* (2013.01); *G06F 2009/45595* (2013.01)

(58) Field of Classification Search
CPC ............. G06F 9/45504; G06F 9/45558; G06F 2009/45579; G06F 2009/45595
See application file for complete search history.

(56) References Cited

U.S. PATENT DOCUMENTS

| | | | |
|---|---|---|---|
| 8,768,681 B2 | 7/2014 | Kajitani et al. | |
| 9,846,634 B2 | 12/2017 | Ji et al. | |
| 10,303,817 B2 * | 5/2019 | Sebastian | G01M 17/007 |
| 10,698,684 B2 | 6/2020 | Beckett | |
| 11,169,991 B2 | 11/2021 | Riva et al. | |
| 2020/0274731 A1 * | 8/2020 | Antonsson | H04L 45/30 |
| 2020/0356399 A1 | 11/2020 | Kiffmeier et al. | |
| 2020/0396101 A1 * | 12/2020 | Wasilczyk | H04L 12/40013 |
| 2021/0309064 A1 * | 10/2021 | Negishi | B60K 35/22 |
| 2022/0147379 A1 | 5/2022 | Urias et al. | |
| 2022/0242190 A1 * | 8/2022 | Stanford | H04B 5/26 |

FOREIGN PATENT DOCUMENTS

| | | |
|---|---|---|
| CN | 201965787 U | 9/2011 |
| CN | 104036323 A | 9/2014 |

* cited by examiner

*Primary Examiner* — Qing Chen
*Assistant Examiner* — Amir Soltanzadeh
(74) *Attorney, Agent, or Firm* — Christopher Storms; Brooks Kushman P.C.

(57) ABSTRACT

A Controller Area Network (CAN) message is received from an application emulator. Based on a first file that includes, for each of a plurality of CAN message names, an ECU event identifier, an ECU event included in the CAN message is determined. Based on a second file that maps the ECU event to a hardware abstraction layer (HAL) property, a hardware abstraction layer is invoked; the CAN message is sent to the HAL, which responds to the CAN message.

10 Claims, 2 Drawing Sheets

CONTROLLER AREA NETWORK EMULATION ARCHITECTURE

BACKGROUND

Vehicles can include various computing devices, i.e., electronic devices with processors and memories, that communicate on a vehicle network. The vehicle network can include a communications bus such as a controller area network (CAN) or the like, and/or other wired and/or wireless mechanisms. For example, a vehicle can include sensing devices, actuator devices, electronic control units (ECUs), human machine interface (HMI) devices, etc., that send and/or receive data over a CAN bus. Devices on a vehicle network can transmit messages that include an event, i.e., data in a message at a receiving device evaluates to determine if some action or occurrence is being reported by a sending device, typically so that the receiving device can determine whether to take some action. For example, ECUs in a vehicle can detect events in messages broadcast on a CAN bus, and can determine whether to take action such as, to list just a few of the many possible examples, adjusting a display in a vehicle HMI, adjusting a vehicle speed, controlling vehicle steering, etc. Because a vehicle network and its associated devices can be complex, testing the vehicle network and its operation with associated devices can likewise be complex.

DETAILED DESCRIPTION

Overview

Figure 1:
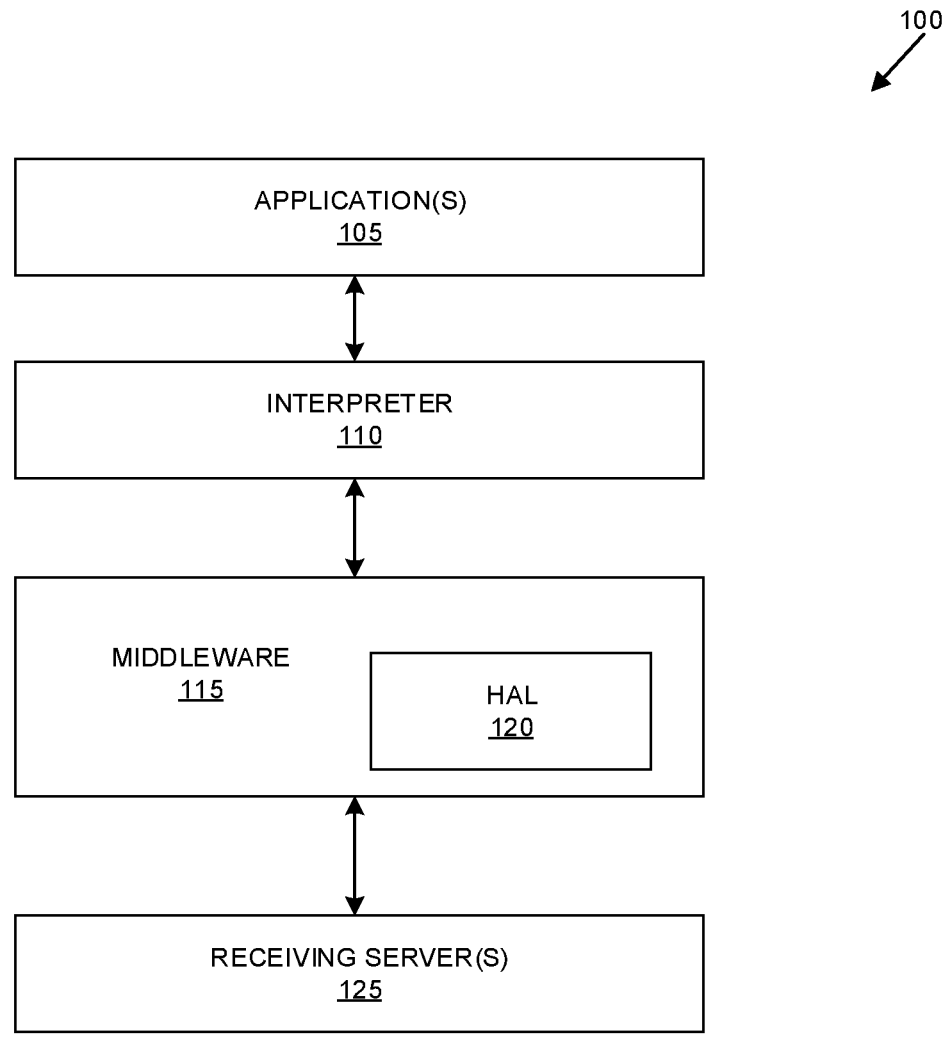
FIG. 1 is a block diagram illustrating an example architecture for processing controller area network (CAN) messages.

Systems and methods disclosed herein can reduce complexities, and increase efficiencies, in computer and network architectures for testing communications on a vehicle CAN bus. In an exemplary implementation, one or more applications generate CAN messages including events. The applications can be emulated applications, i.e., a CAN message can be generated by an emulator that provides the CAN message to an interpreter that determines an event in the CAN message based on a can database file. Once the event is determined, the interpreter then generates a file mapping the event in the CAN message to a hardware abstraction layer (HAL) property. Hardware abstraction layers are used with many different operating systems to communicate with hardware a HAL property can be a parameter or setting for a hardware device. The file mapping the event in the CAN message can thus be sent to the hardware abstraction layer which in turn can send a message to a receiving server, e.g., an electronic control unit (ECU) emulator that can act on the message. With the interpreter determining the event in the CAN message, then mapping the event to a HAL property, and then invoking the HAL to in turn invoke the ECU, simulation and/or testing of a CAN configuration can be performed with reduced complexity and/or increased efficiency. Advantageously, techniques disclosed herein will allow any kernel-based operating system to send CAN messages to emulate a physical ECU, and events for CAN messages, to simulate and test scenarios for a physical ECU environment.

Accordingly a system can comprise a computer including a processor and a memory, the memory storing instructions executable by the processor to: receive a Controller Area Network (CAN) message from an application emulator; based on a first file that includes, for each of a plurality of CAN message names, an ECU event identifier, determine an ECU event included in the CAN message; based on a second file that maps the ECU event to a hardware abstraction layer (HAL) property, invoke a hardware abstraction layer and send the CAN message to the HAL; and receive a response from the HAL.

The second file may include the respective one of the CAN message names for the CAN message, a message ID for the CAN message, and the HAL property. The instructions to invoke the hardware abstraction layer and send the CAN message to the HAL may include instructions to execute a script that populates a schema provided in the second file with a hardware abstraction layer property to be invoked based on the CAN message. The script may be JavaScript. Executing the script may create a JavaScript Object Notation (JSON) file. The HAL may send a second message to an electronic control unit (ECU) emulator based on the HAL property. Sending the second message to the ECU emulator may include forming a socket that provides the second message to the ECU emulator. Sending the second message to the ECU emulator may include sending the second message to a middleware layer that receives the second message according to a generic communication protocol that is not specific to and that then provides the second message to the ECU emulator.

A method, can comprise receiving a Controller Area Network (CAN) message from an application emulator; based on a first file that includes, for each of a plurality of CAN message names, an ECU event identifier, determining an ECU event included in the CAN message; based on a second file that maps the ECU event to a hardware abstraction layer (HAL) property, invoking a hardware abstraction layer and send the CAN message to the HAL; and receiving a response from the HAL.

The second file may include the respective one of the CAN message names for the CAN message, a message ID for the CAN message, and the HAL property. Invoking the hardware abstraction layer and sending the can message to the HAL may include executing a script that populates a schema provided in the second file with a hardware abstraction layer property to be invoked based on the CAN message. The script may be JavaScript. Executing the script may create a JavaScript Object Notation (JSON) file. The HAL may send a second message to an electronic control unit (ECU) emulator based on the HAL property. Sending the second message to the ECU emulator may include forming a socket that provides the second message to the ECU emulator. Sending the second message to the ECU emulator may include sending the second message to a middleware layer that receives the second message according to a generic communication protocol that is not specific to and that then provides the second message to the ECU emulator.

Now with reference to FIG. 1, a system 100 includes one or more applications 105 that can provide CAN messages to an application interpreter 110. The interpreter 110 consults a first file, typically a can database file, to identify an event in the CAN message. The interpreter 110 then executes programming to, based on a second file, generate a mapping of the identified event to a HAL property. In an exemplary implementation, the programming executed by the interpreter 110 can populate a second file defined by a mapping schema to provide a plurality of messages to middleware 115, which includes a hardware abstraction layer (HAL) 120. The HAL 120 can then in turn provide a message that includes the second file or a portion thereof to one or more receiving servers 125. For example, the receiving servers 125 can be included in an ECU emulator that can then provide a response to a message from the HAL 120.

Applications 105, the interpreter 110, middleware 115, including the HAL 120, and receiving servers 125 can be implemented as program instructions stored in a memory of respective computers, and executable by respective processors of the computers. Implementations are also possible in which various of the foregoing components could be implemented on a same computer. For example, applications 105 can be implemented as an application emulator on a suitable computer, e.g., via Android Studio (described at the time of filing this application at https://developer.android.com/studio), or a CAN Bus Emulator implemented via Simulink, provided by MathWorks® of Natick, MA, USA (described at the time of filing this application at https://www.mathworks.com/products/simulink.html). These or some other emulator can be provided to generate CAN messages provided to the interpreter 110. Further, CAN message playback can be provided via, for example, the "CarMaker" solution provided by IPG Automotive GmbH of Karlsruhe, Germany, and described at the time of filing this application at https://ipg-automotive.com/en/products-solutions/software/carmaker/.

The interpreter 110 can be implemented in a variety of one or more programming and/or scripting languages including, by way of example and without limitation, Java™, JavaScript, Python™, etc. The interpreter 110 can receive a CAN message from an application 105, e.g., an emulator such as discussed below, in a conventional format. For example, a CAN message typically includes a first set of numbers providing a CAN identifier (or CAN ID), along with a set of data bytes. The numbers in a CAN message are typically in hexadecimal format. The data bytes can specify one or more events, and are sometimes referred to as a CAN signal. Thus, a CAN message has the format CAN ID, DATA. As will be understood, a CAN ID specifies a type of data (or signal or event) provided in a CAN message that includes the CAN ID.

A CAN .dbc (or DBC) file can specify rules for decoding a raw CAN message in hexadecimal format, i.e., includes, for each of a plurality of CAN IDs, an ECU event identifier or name, i.e., that can be used to determine an ECU event included in the CAN message. For example, based on a CAN ID in raw CAN message data, it is possible to determine a message name or identifier corresponding to the CAN ID, and then a signal name, a signal value, and/or signal units. To name just a few examples, a signal name, which, as will be understood, could be accompanied by an appropriate signal value and/or signal unit, could be an engine speed, a flag specifying whether a seatbelt buckle is latched, a flag specifying whether a door is latched, a steering wheel torque, a resolution for displaying a graphic on an HMI display, etc. Accordingly, interpreter 110 can look up raw data values in a CAN message in a CAN .dbc file to determine a CAN ID and one or more events, i.e., signals, specified in a CAN message.

The interpreter 110 can invoke the hardware abstraction layer based on the decoded and message. The interpreter 110 can send a file (which may be referred to herein as a "second" file to distinguish it from a "first" file that is a DBC file). To the HAL generated by executing a script that populates a schema provided in the second file with a hardware abstraction layer property to be invoked based on the CAN message. Once the interpreter 110 has decoded a CAN message, e.g., typically into a human-readable format, based on a second file that maps the ECU event to a hardware abstraction layer (HAL) property, the interpreter 110 can invoke the hardware abstraction layer and send the CAN message to the HAL. The interpreter 110 can be implemented on a same or a different computer then the application 105. For example, an application 105 could be implemented on a first computer that sends CAN messages via a local area network and/or a wide area network to a second computer on which the interpreter 110 is implemented.

The second file that maps the ECU event to a HAL property implements what can be referred to as a mapping schema. Interpreter 110 can include programming, e.g., Java (and/or other suitable) programming that executes JavaScript, where the JavaScript (and/or script according to some other suitable scripting language) includes instructions to generate respective records of data to be sent to the HAL 120. For example, the interpreter 110 can execute a script such as JavaScript to use the mapping schema to generate the records to be sent to the HAL 120 in the form of a JavaScript Object Notation (JSON) file. In one implementation, the second file includes one or more records, where each record corresponds to a respective CAN message, and has a format of message_name, message_ID, HAL_property. The "message_ID," sometimes also referred to as "signal_name," is a CAN signal or event name corresponding to the CAN signal name mentioned above, such as EngineSpeed or SteeringWheelTorque. The message_name is a conventionally-used naming property for the CAN message. HAL_property is an identifier, that will be understood by the HAL 120, for an HAL property, e.g., a requested engine speed, and input steering wheel toward, a requested resolution of a graphic display, etc. An example of a file (of only two records, whereas, as will be appreciated, typically the file would be much longer) sent from the interpreter 110 to the HAL 120 is reproduced below:

{"message_name": "SIGNALNAME_RX_EXAMPLE_SIGNAL", "msgID": "0x01a", "vhalproperty": "123456789"}

{"message_name": "NEWSIGNALNAME_RX_EXAMPLE_SIGNAL", "msgID": "0x01a", "vhalproperty": "987654321"}

The HAL 120 is included in a layer of middleware 115. The middleware 115 can further include programming to open sockets to send requests to hardware devices via an operating system kernel, e.g., devices can include input or output devices such as displays, microphones, etc., vehicle sensors, vehicle ECUs, etc., and, in presently described implementations, an emulator for a hardware architecture including such devices implemented on receiving server 125. In one implementation, middleware 115 utilizes Scalable service-Oriented MiddlewarE over IP (SOME/IP), described at the time of filing this patent application at some-ip.com. The HAL 120 can provide a mapping or association of an HAL property to a CAN message_ID, as explained above.

The HAL 120, via a middleware 115 process, e.g., as provided by SOME/IP or the like, can then send a message (sometimes referred to herein as a second message or distinction from a first message such as the above CAN message), including or based on the HAL property, to a receiving server 125, e.g., make a function call or the like to the receiving server 125, e.g., via an application programming interface (API) or the like. Further, as will be understood, the middleware 115 could form a socket to provide communications to a receiving server 125, and the second message could be sent via the socket. Thus, as will be further understood, sending the second message to the ECU emulator can include sending the CAN message to the middleware 115 layer that then receives CAN message according to a generic communication protocol that is not specific to CAN and that then provides the second message to the ECU emulator.

For example, the server 125 could be an ECU emulator that provides a response based in part on acting on the HAL property. The server 125 can provide the response to the middleware 115 including the HAL 120, which in turn can provide a response to a requesting application 105. The response can alternatively or additionally be stored by a computer associated with a requesting application 105.

Figure 2:
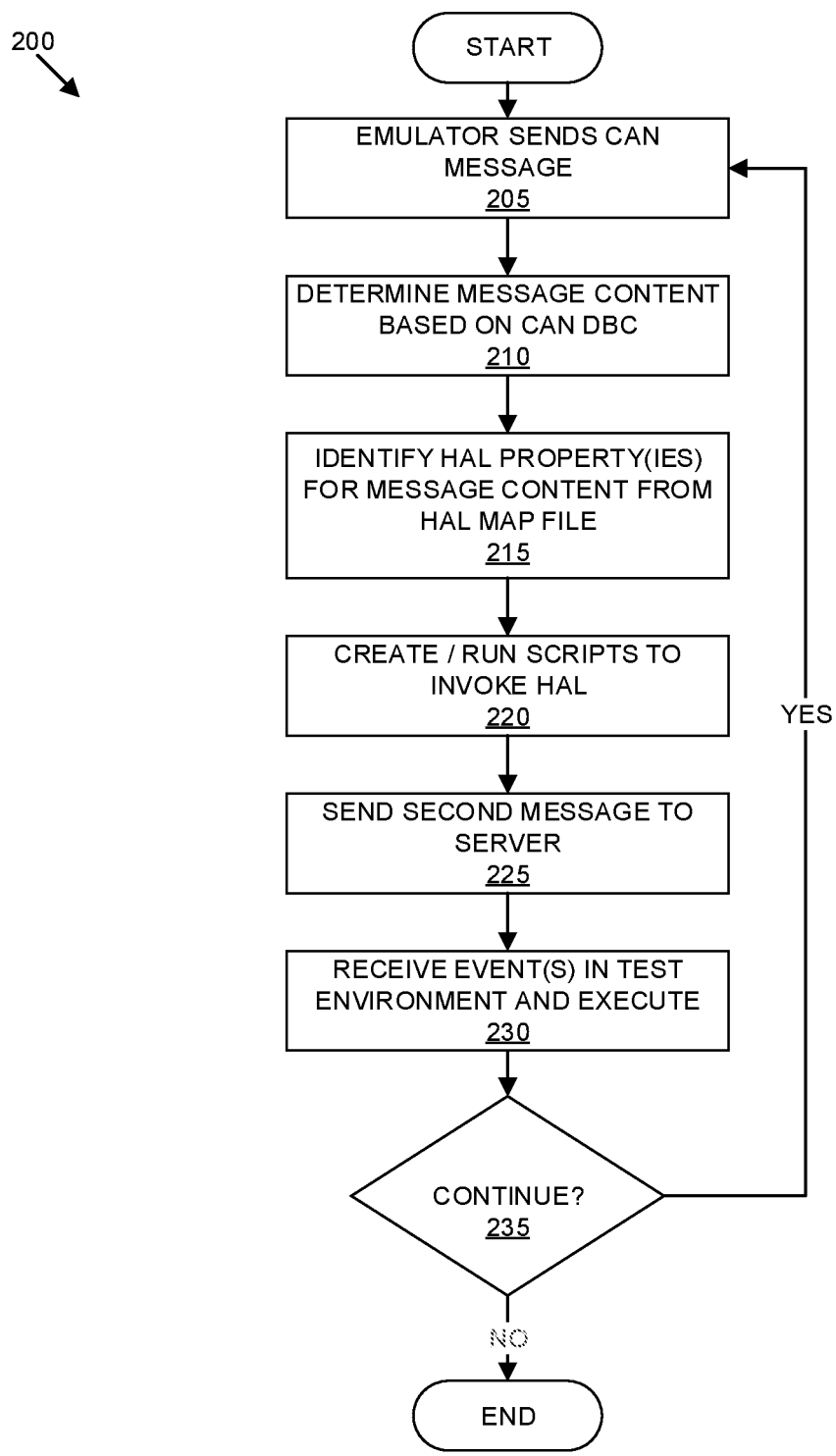
FIG. 2 is a flowchart of an exemplary process for processing CAN messages.

FIG. 2 is a flowchart of an exemplary process for processing CAN messages. The process begins a block 205, in which an application 105, e.g., an ECU emulator, transmits a CAN message that is received in an interpreter 110.

Next, in a block 210, the interpreter parses the CAN message as described above, using a can DBC file, to determine content of the message, including both a CAN message ID and a data payload.

Then, in a block 215, the interpreter 110, based on the CAN message ID, determines an HAL property associated with the CAN message.

Then, in a block 220, the middleware 115, including the HAL 120, receives the CAN message and the determined HAL property associated with the CAN message, and executes programming, e.g., a JavaScript as described above, to invoke the HAL property in a receiving server 125. JavaScript or the like can provide a file as shown, for example, in Appendix A. It is to be understood that, in practice, the "file" could include only one record, and could stand for providing requests to servers 125 on a continuing or near-continuing basis. That is, the process 200 could execute in a loop, providing second messages to servers 125 as CAN messages are received and interpreted by the interpreter 110.

Next, in a block 225, the middleware 115 sends a second message, e.g., via a generic protocol and a formed socket as described above, to a receiving server 125.

Next, in a block 230, the receiving server, e.g., an ECU emulator, receives the second message and provides a response to the middleware 115, as described above.

In a block 235, which can follow the block 230, the middleware 115 determines whether to continue the process 200. For example, user input could be received to terminate the process, further CAN messages may not be received, etc. The process can and following the block 235, or can return to the block 205.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

"Based on" encompasses "based wholly or partly on." If, herein, a first thing is described and/or claimed as being "based on" the second thing, then the first thing is derived or calculated from the second thing, and/or output from an algorithm, process, or program function that accepts some or all of the second thing as input and outputs some or all of the first thing.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims. All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a middleware computer including a processor and a memory, the memory storing instructions executable by the processor to:
   receive a Controller Area Network (CAN) message from an application emulator;
   based on a first file that includes, for each of a plurality of CAN message names, an electronic control unit (ECU) event identifier, determine an ECU event included in the CAN message;
   based on a second file that maps the ECU event to a hardware abstraction layer (HAL) property, invoke a hardware abstraction layer and send the CAN message to the HAL;
   receive a response from the HAL;
   form a socket to an ECU emulator computer; and
   send a second message, based on the HAL property, to the ECU emulator computer via the socket according to a generic, not CAN-specific, communication protocol.

2. The system of claim 1, wherein the second file includes the respective one of the CAN message names for the CAN message, a message ID for the CAN message, and the HAL property.

3. The system of claim 1, wherein the instructions to invoke the hardware abstraction layer and send the CAN message to the HAL include instructions to execute a script that populates a schema provided in the second file with a hardware abstraction layer property to be invoked based on the CAN message.

4. The system of claim 3, wherein the script is JavaScript.

5. The system of claim 3, wherein executing the script creates a JavaScript Object Notation (JSON) file.

6. A method, comprising:
   receiving, in a middleware computer, a Controller Area Network (CAN) message from an application emulator;
   based on a first file that includes, for each of a plurality of CAN message names, an electronic control unit (ECU) event identifier, determining an ECU event included in the CAN message;
   based on a second file that maps the ECU event to a hardware abstraction layer (HAL) property, invoking a hardware abstraction layer and sending the CAN message to the HAL;
   receiving a response from the HAL;
   forming a socket to an ECU emulator computer; and
   sending a second message, based on the HAL property, to the ECU emulator computer via the socket according to a generic, not CAN-specific, communication protocol.

7. The method of claim 6, wherein the second file includes the respective one of the CAN message names for the CAN message, a message ID for the CAN message, and the HAL property.

8. The method of claim 6, wherein invoking the hardware abstraction layer and sending the CAN message to the HAL include executing a script that populates a schema provided in the second file with a hardware abstraction layer property to be invoked based on the CAN message.

9. The method of claim 8, wherein the script is JavaScript.

10. The method of claim 8, wherein executing the script creates a JavaScript Object Notation (JSON) file.

* * * * *

UNITED STATES PATENT AND TRADEMARK OFFICE
CERTIFICATE OF CORRECTION

PATENT NO. : 12,386,644 B2
APPLICATION NO. : 18/145064
DATED : August 12, 2025
INVENTOR(S) : Andrew Magdy Kamal Page 1 of 1

It is certified that error appears in the above-identified patent and that said Letters Patent is hereby corrected as shown below:

In the Claims

| | |
|---|---|
| Column 8, Line 9, Claim 1: | Replace "send" with --sending--; |
| Column 8, Line 14, Claim 1: | Replace "send" with --sending--; and |
| Column 8, Line 22, Claim 3: | Replace "send" with --sending--. |

Signed and Sealed this
Sixteenth Day of September, 2025

Coke Morgan Stewart
*Acting Director of the United States Patent and Trademark Office*